US009300353B1

(12) United States Patent
Hekstra et al.

(10) Patent No.: US 9,300,353 B1
(45) Date of Patent: Mar. 29, 2016

(54) START OF FRAME DELIMITER IN A COMMUNICATION PACKET

(71) Applicant: NXP B.V., Eindhoven (NL)

(72) Inventors: Andries Hekstra, Eindhoven (NL); Stefan Drude, Waalre (NL); Frank Leong, Veldhoven (NL); Arie Koppelaar, Giessen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/683,455

(22) Filed: Apr. 10, 2015

(51) Int. Cl.
*H04B 1/00* (2006.01)
*H04B 1/7073* (2011.01)
*H04B 1/709* (2011.01)
*H04L 29/06* (2006.01)

(52) U.S. Cl.
CPC ............ *H04B 1/70735* (2013.01); *H04B 1/709* (2013.01); *H04L 69/22* (2013.01); *H04B 2201/7073* (2013.01)

(58) Field of Classification Search
CPC ........... H04B 1/69; H04B 1/707; H04J 13/10; H04J 13/0014
USPC ........... 375/146, 130, 147, 260; 370/150, 328
See application file for complete search history.

(56) References Cited

U.S. PATENT DOCUMENTS

| 2004/0196926 | A1* | 10/2004 | Chien | ................... | H04L 7/042 375/316 |
| 2010/0157907 | A1* | 6/2010 | Taghavi Nasrabadi | .. | H04B 1/69 370/328 |
| 2013/0235908 | A1* | 9/2013 | Zhang | ................. | H04J 13/0014 375/146 |
| 2013/0272344 | A1* | 10/2013 | Lakkis | ................... | H04B 1/707 375/150 |

OTHER PUBLICATIONS

AMS AS3932 Data Sheet, 3D Low Frequency Wakeup Receiver, Nov. 5, 2014.

\* cited by examiner

*Primary Examiner* — Khai Tran
(74) *Attorney, Agent, or Firm* — Rajeev Madnawat

(57) ABSTRACT

Various exemplary embodiments relate to a device for performing a method of communication transmission. The device may include a memory; a processor configured to: determine a spreading code with low sidelobe levels in its autocorrelation sequence to be used; create a Start of Frame Delimiter (SOFD) for a packet including the spreading code and a cyclic prefix, wherein the cyclic prefix is a portion of the spreading code; and transmit the packet with the SOFD.

18 Claims, 10 Drawing Sheets

AUTOCORRELATION FUNCTION OF BARKER-7 CODE

START OF FRAME DELIMITER IN A COMMUNICATION PACKET

TECHNICAL FIELD

Various exemplary embodiments disclosed herein relate generally to start of frame delimiter in a communication packet.

Start of Frame Delimiters (SOFD) are frequently used in packet communications to identify the beginning of the packet or header area. Previous to a SOFD may be a preamble, for example, which may queue a communications device by initiating its electronics and waking up the system. SOFDs are frequently short bit patterns that may be prone to errors. In an Ethernet frame, for example, an SOFD is followed by the Media Access Control (MAC) address. SOFDs frequently have the ability of auto correlation.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts that/which will follow in later sections.

Various embodiments relate to a method of communication transmission. The method may include determining a coding format to be used; creating a Start of Frame Delimiter (SOFD) for a packet including coding the SOFD including a cyclic prefix, wherein the SOFD with the cyclic prefix is a spreading code with low sidelobe levels in its autocorrelation sequence, such that resulting synchronization ambiguities are minimized; and transmitting the packet with the cyclic prefix and the main SOFD.

Various embodiments include creating the SOFD by coding the SOFD including a cyclic postfix, wherein the SOFD with the cyclic prefix and cyclic postfix is autocorrelation capable.

Various embodiments include the cyclic prefix and cyclic postfix being less than half the length of the cyclic sequence.

Various embodiments include coding the SOFD by coding the SOFD using a Gold Sequence.

Various embodiments include coding the SOFD including multiple cyclic sequences.

Various embodiments include coding the SOFD using a Barker Sequence.

Various embodiments include coding the SOFD using two Barker Sequences.

Various embodiments include the cyclic prefix being less than half the length of the cyclic sequence.

Various embodiments relate to a device for performing a method of communication transmission, the device comprising: a memory; a processor configured to: determine a coding format to be used; create a Start of Frame Delimiter (SOFD) for a packet including coding the SOFD including a cyclic prefix, wherein the SOFD with the cyclic prefix is a spreading code with low sidelobe levels in its autocorrelation sequence, such that resulting synchronization ambiguities are minimized; and transmit the packet with the cyclic prefix and the main SOFD.

Various embodiments include the processor further configured to code the SOFD including a cyclic postfix, wherein the SOFD with the cyclic prefix and cyclic postfix is autocorrelation capable.

Various embodiments include the processor further configured to code the SOFD using a Gold Sequence.

Various embodiments include the processor further configured to code the SOFD to include multiple cyclic sequences.

Various embodiments include the processor further configured to code the SOFD using a Barker Sequence.

Various embodiments include the processor further configured to code the SOFD using two Barker Sequences.

Various embodiments relate to a tangible and non-transitory machine-readable storage medium encoded with instructions thereon for execution of a method of communication transmission, wherein said tangible and non-transitory machine-readable storage medium comprising: instructions for determining a coding format to be used; instructions for creating a Start of Frame Delimiter (SOFD) for a packet including coding the SOFD including a cyclic prefix, wherein the SOFD with the cyclic prefix is a spreading code with low sidelobe levels in its autocorrelation sequence, such that resulting synchronization ambiguities are minimized; and instructions for transmitting the packet with the cyclic prefix and the main SOFD.

Various embodiments include instructions for coding the SOFD including a cyclic postfix, wherein the SOFD with the cyclic prefix and cyclic postfix is autocorrelation capable.

Various embodiments include the cyclic prefix and cyclic postfix being less than half the length of the cyclic sequence.

Various embodiments include coding the SOFD using a Gold Sequence.

BRIEF DESCRIPTION OF THE DRAWINGS

In order to better understand various exemplary embodiments, reference is made to the accompanying drawings, wherein.

DETAILED DESCRIPTION

Figure 1:
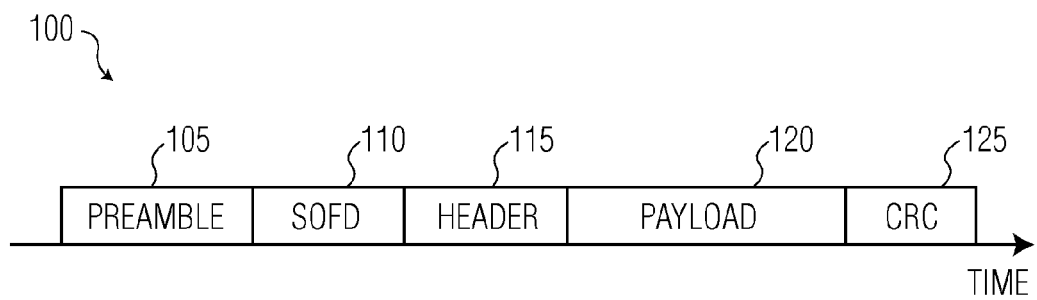
FIG. 1 illustrates a communication packet layout.

The ambiguity function of a radar waveform is commonly referred to as the autocorrelation of the radar waveform, where the radar waveform should have only a single peak to allow for the best detection and ranging performance. In communication applications, SOFD may be used to identify the beginning of a packet header or payload. Autocorrelation may also be used to detect such SOFD. Spreading codes may contain low sidelobe levels in their autocorrelation sequence, such as to minimize resulting synchronization and/or ranging ambiguities. Low side lobes of autocorrelation of synchronization sequences, such as Barker sequences, are normally defined by considering a periodic repetition of the sequence to correlate with. Barker codes are frequently considered for radar, while Gold and Kasami codes may be considered for cellular communication applications. When such a synchronization sequence is used in a communication packet as start of frame delimiter, ideal correlation behavior in this context may be realized by prefixing the sequence with a small cyclic prefix which consists of its own tail.

Embodiments of the present invention include digital communication systems which use a packet structure in their communication protocol. For example, ultrasound, light or radio communication may be used as carriers of the information. In some embodiments, communication may be unidirectional from a transmitter to a receiver. In other embodiments, communication may be bidirectional between two transceivers that both contain a transmitter and a receiver part. In case the transmitted signal is not continuously active, but only present during time intervals of limited duration with idle time in between, the receiver may need to detect the presence of such active signal intervals. The packet acquisition task of a receiver can be the cause of a large fraction of the total power consumption and/or Integrated Circuit (IC) area of the receiver. A received signal may be weak, and discernible by means of its special structure. In the case when a received signal may be weak, the receiver must run signal processing algorithms with sufficient numerical accuracy to discern the presence of this signal structure, characteristic of the presence of the communication packet. Different naming may be used, and packets may be called frames or bursts. In many applications transmitted signals may be considered as a function of time on a time axis. Embodiments of the present invention may similarly apply in the case of spatial signals, or signals of some other 1, 2, or higher dimensional coordinate systems. Some embodiments may consider time based communication.

Referring now to the drawings, in which like numerals refer to like components or steps, there are disclosed broad aspects of various exemplary embodiments.

FIG. 1 illustrates a communication packet layout 100. Communication packet layout 100 may include preamble 105, Start of Frame Delimiter (SOFD) 110, header sequence 115, payload 120 and Cyclic Redundancy Check sum (CRC) 125. Different communication packets may have a certain signal format that resembles that of communication packet layout 100. SOFD 110 may be any kind of Start of Frame Delimiter. The preamble may consist of a number of repetitions of a certain (binary) sequence with favorable auto- or cross-correlation properties. The repetitions may have a different sign or amplitude. The repetitions may, for example, form a Barker, Kasami, or Gold sequence.

A transmitter may assume that the receiver does not lose some fraction of the start of the packet during reception. The receiver may, for example, operate in duty cycled mode, in which it may cyclically go to sleep for a certain duration, in order to reduce the power consumption. The receiver may wake up in the middle of the reception of a preamble. When the receiver wakes up in the middle of receiving the preamble, a sufficient number of multiples of the Barker sequence should be present in order for the received part of the preamble to serve its purpose in the receiver. Similarly, the receiver may lose some initial part of the preamble as its automatic gain control unit needs some time to settle to a gain value that allows proper reception of the communication packet.

In general, a preamble may serve the following purposes:
Packet detection;
Settling of automatic gain Control (AGC);
Channel estimation;
Carrier frequency recovery; and
Bit clock recovery.

Carrier phase recovery and bit phase recovery may be carried out during reception of the preamble. These receiver estimation tasks may take some time to complete and, therefore, may run in parallel or in sequence. The preamble, thus, may be better suited to have a sufficient duration, especially if reception at low signal to noise ratio is intended.

In many applications, the preamble itself cannot serve the purpose of unique time synchronization of transmitter and receiver, as the preamble contains a number of repetitions of the same sequence. Then, the preamble is typically followed by a unique Start of Frame Delimiter sequence that may not occur elsewhere in the radio packet. The receiver can implement a matched filter for this SOFD sequence, in order to precisely detect its arrival at the receiver. In case of multipath communication such as radio, the receiver may be fed with the sum of a number of copies of the transmitted signal, each with its own delay, gain, and phase. In such cases, the matched filter produces multiple peaks that correspond to the respective delays of the multipath components. The SOFD may also be used for fine carrier or bit clock recovery.

Header sequence 115 may include a sequence index of the radio packet as well as mode information about a communication scheme that is employed. Additional information contained in the header may be the length of the radio packet, in case of variable length communication packets. The header sequence 115 may also contain parity check bits to protect, for example, the communication mode bits against transmission errors with high certainty.

Payload 120 may contain a part of the message bits that are actually communicated between the parties. The payload modulation format may differ from that of preamble 105, SOFD 110, or header sequence 115. For example, time domain, frequency domain, or code division multiple access modulation (TDMA, FDMA, or CDMA), may be used in the payload part of the radio packet. In embodiments of two or higher dimensional signals, the SOFD field may include an area or volume, rather than a field in the sense of a one-dimensional interval.

Figure 2:
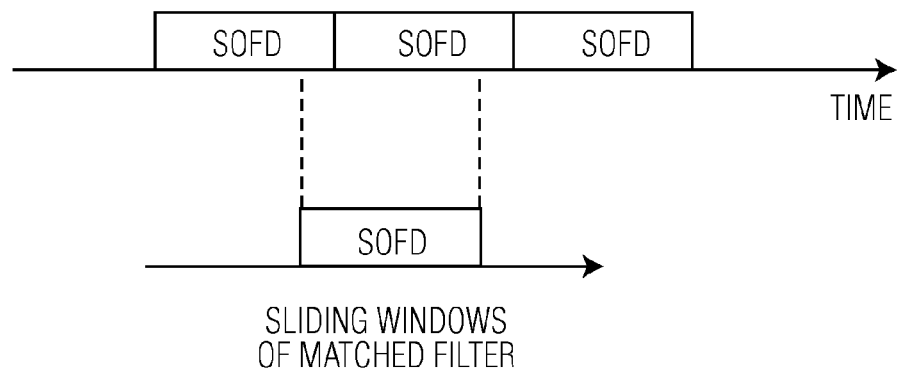
FIG. 2 illustrates how cross-correlation properties of SOFD sequence are defined when received SOFD sequence resides amidst copies of itself.

FIG. 2 illustrates how cross-correlation properties of an SOFD sequence are defined when received SOFD sequence resides amidst copies of itself. For an SOFD sequence, mathematically chosen sequences may be used for which a matched filter not only produces a high peak when the filter is aligned with an ideal received SOFD sequence, but also produces a very small output signal in case the matched filter is misaligned with the ideal received SOFD sequence. The mathematical function that may matter in this respect is the cross-correlation of the received SOFD signal with the ideal SOFD signal (by the matched filter). In the mathematical design of these sequences, some assumption may need to be made about the context in which the received SOFD sequence resides, during this cross-correlation.

Figure 3:
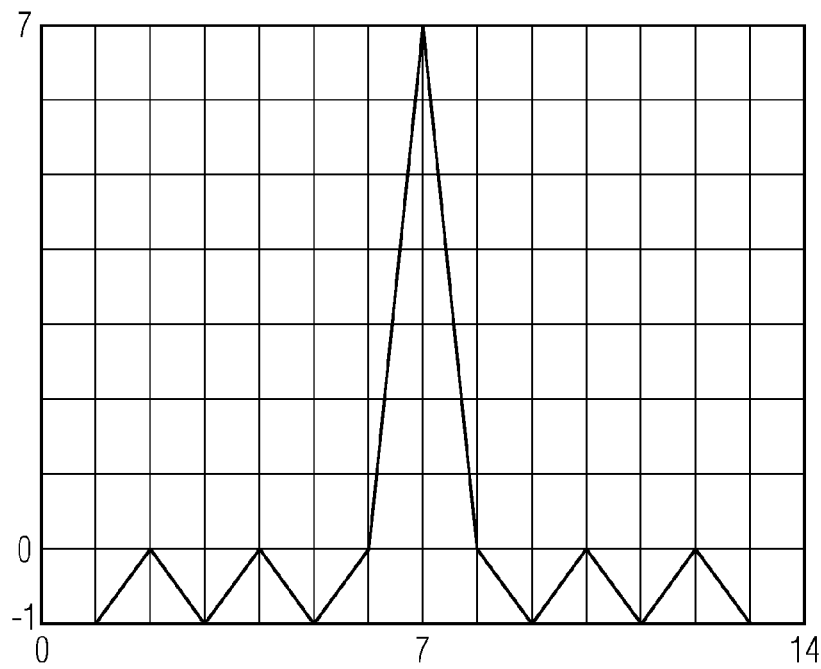
FIG. 3 illustrates a autocorrelation of Barker sequence of length 7.

FIG. 3 illustrates an autocorrelation without cyclic extension of Barker sequence of length 7. The cross-correlation properties of the SOFD sequence may have been defined when the received SOFD sequence is placed amidst an all-zeroes signal. However, regardless of such changes to the definition of the mathematical design of the SOFD sequence, it is infrequently the case that the cross-correlation properties are defined for the context of the SOFD sequence, of it being placed amidst some preamble and some, in general, unpredictable header field. The cross correlation for the context of FIG. 3 is called the cyclic cross-correlation. In case one assumes that an ideal copy of the SOFD sequence has been received, the cross-correlation function is identical to the autocorrelation function. Consequently, the favorable cross-correlation properties of the SOFD sequence may not be reflected from its mathematical design context into the actual context of the communication packet of FIG. 1. FIG. 3 includes an autocorrelation of the Barker sequence of length 7. However, the favorable, small autocorrelation values of 0 and −1, when a binary Barker sequence is mapped onto +/−1 sequence, are not obtained when the Barker-7 sequence is placed in communication packet layout 100, due to overlap, similar to that shown in FIG. 2 of the sliding window for off-central positions of the sliding window with the preamble and header fields.

Figure 4:
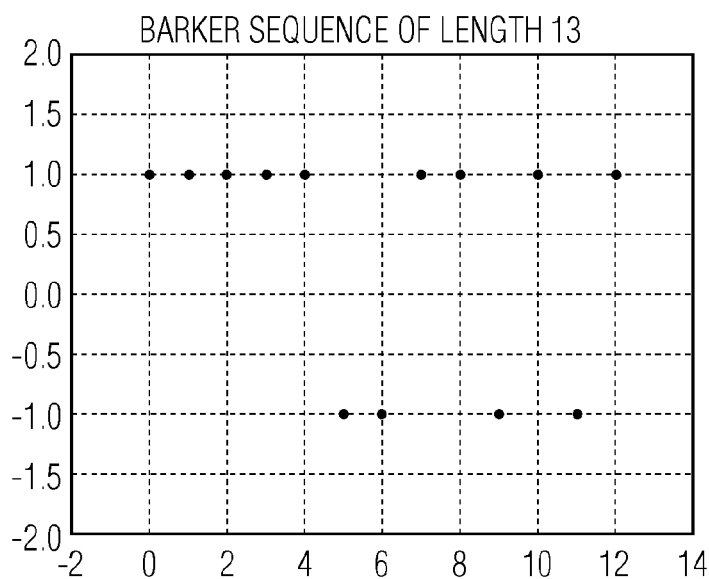
FIG. 4 illustrates a Barker sequence of length 13.

FIG. 4 illustrates a Barker sequence of length 13. The ideal autocorrelation properties of a Barker sequence may not be realized by placing them in a context of random bits. In order to better illustrate that the desired correlation behavior is realized at the edge of mere repetitions of the Barker sequences, one may consider a concatenation of two Barker sequences, including one Barker sequence of length 13 such as that shown in FIG. 4, placed in some context. In a communication packet this context, in the case of a single Barker sequence, for example, can correspond to the tail of the preamble or the start of the packet header.

Figure 5:
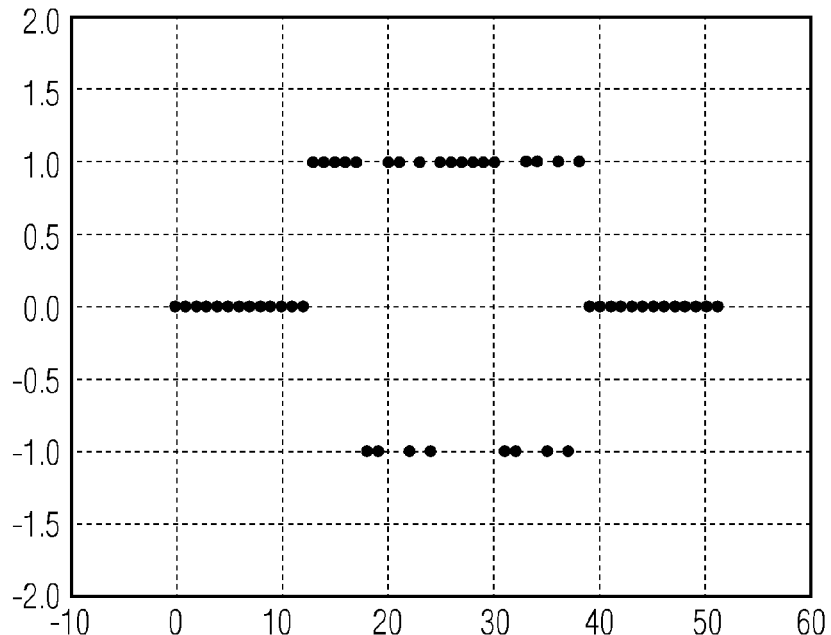
FIG. 5 illustrates a concatenation of two Barker sequences amidst all zeroes samples.
Figure 6:
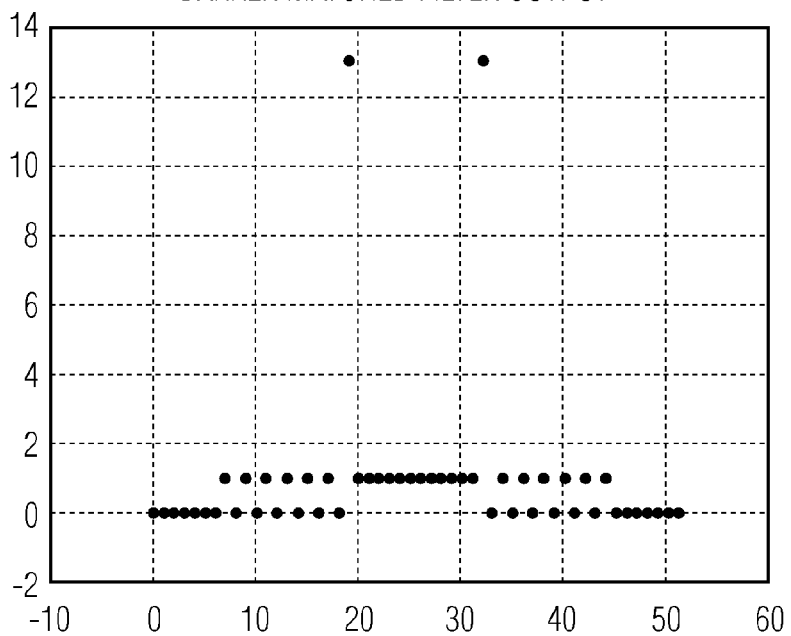
FIG. 6 illustrates an output signal of Barker matched filter when the input signal is that depicted in FIG. 5.

FIG. 5 illustrates a concatenation of two Barker sequences amidst all zeroes samples. FIG. 5 shows two repetitions of the Barker sequence placed amidst 13 zeros on either side. FIG. 6 illustrates an output signal of a Barker matched filter when the input signal is that depicted in FIG. 5. FIG. 6 includes the output of a matched filter for the Barker sequence for this input signal of FIG. 5. Visible are the two correlation peaks obtained with the matched filter that has been normalized to have delay zero, as aligned with one of the Barker sequences in the input signal. In this case, only "low sidelobe" matched filter outputs occur away from these correlation peaks.

Figure 7:
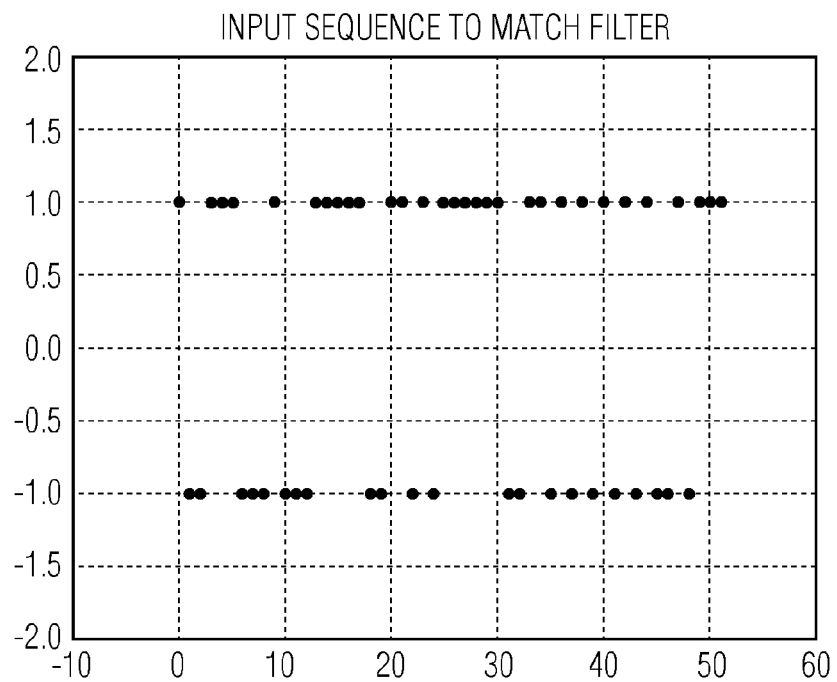
FIG. 7 illustrates a sequence of thirteen random +/−1 values (such as e.g. in the tail of the preamble), followed by two Barker sequences of length 13, followed by another random sequence of thirteen +/−1 values.

FIG. 7 illustrates a sequence of thirteen random +/−1 values, such as for example in the tail of the preamble, followed by two Barker sequences of length 13, followed by another random sequence of thirteen +/−1 values. In FIG. 7, the context of 13 all zeros samples on either side of the two Barker sequences has been replaced by two random +/−1 sequences of length 13. Such a pseudo-random context could correspond to the tail of the preamble sequence or the start of the packet header field.

Figure 8:
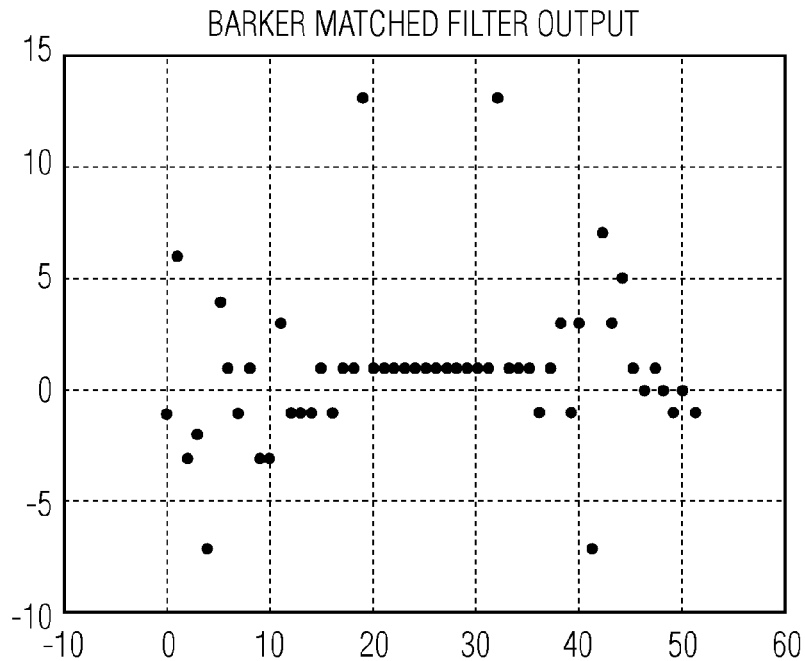
FIG. 8 illustrates an output signal of a Barker matched filter for the input signal of FIG. 7.

FIG. 8 illustrates an output signal of a Barker matched filter for the input signal of FIG. 7. FIG. 8 illustrates how the sidelobes at the matched filter output have increased to a significant fraction of the height equal to 13 of the matched filter output peaks. In case some noise would be added to the signal of FIG. 7, a sidelobe value could become larger than one of the ideal correlation peaks at the correction positions, which would lead to mis-synchronization.

Figure 9:
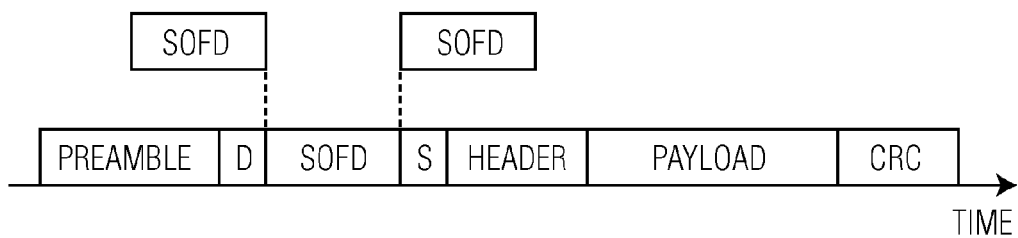
FIG. 9 illustrates an embodiment in which ideal autocorrelation properties of SOFD sequence are fully realized through placement in a well-defined context that corresponds to the mathematical design of the SOFD sequence.

FIG. 9 illustrates an embodiment in which ideal autocorrelation properties of a SOFD sequence are fully realized through placement in a well-defined context that corresponds to the mathematical design of the SOFD sequence. Embodiments described herein include putting the SOFD sequence within a small context similar to that of FIG. 2 into the radio packet as depicted in FIG. 9. The SOFD is placed amidst a trailing and starting portion of the SOFC itself, which acts as cyclic prefix and postfix, respectively. This context which constitutes part of the ideal context of FIG. 2, when the time offset is smaller than the length of the pre- and post-fix, the cross-correlation of an ideal received packet and the SOFD sequence by the SOFD matched filter coincides with the ideal, cyclic autocorrelation function of the mathematical design of the SOFD sequence. The fact that one realizes the ideal correlation properties in the context of the communication scheme may lower the probability that due to noise an incorrect time alignment position of the SOFD is mistaken for the correct alignment position.

Additionally, the predictable low autocorrelation values that one expects for a limited time offset allow the estimation of the receiver noise level from the off-centre cross-correlation values of the received SOFD sequence and its cyclic prefix, postfix, and the sliding window SOFD filter implemented by the SOFD matched filter. Such accurate estimation that any significant signal outside of the main peak of, for example, FIG. 3 must correspond to noise, also allows accurate setting of the threshold that must be surpassed for the detection of the peak that leads to the detection of the SOFD position and obtaining time alignment between transmitter and receiver.

Figure 10:
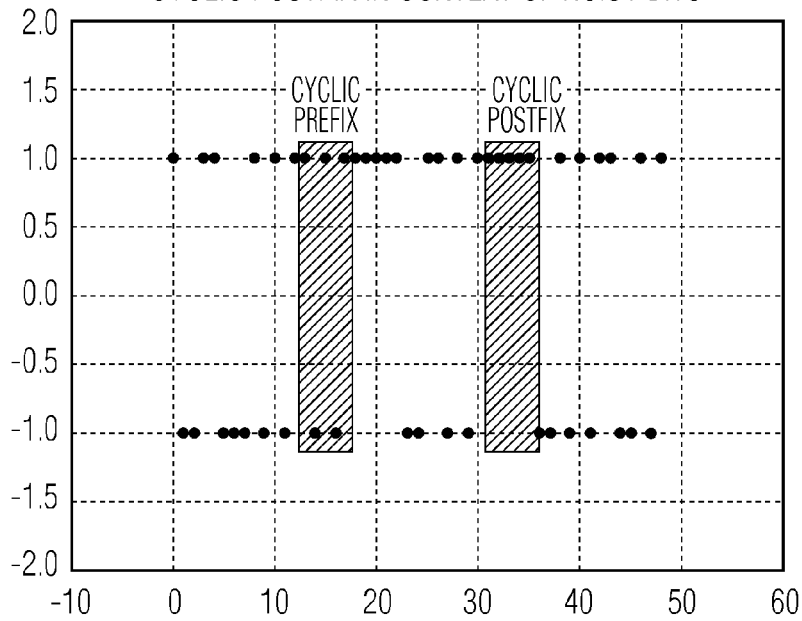
FIG. 10 illustrates a cyclic prefix, Barker sequence, cyclic postfix placed in context of random +/−1 samples according to certain embodiments.

FIG. 10 illustrates a cyclic prefix, Barker sequence, cyclic postfix placed in context of random +/−1 samples according to certain embodiments. FIG. 10 depicts the Barker sequence prepended with the tail part of itself as cyclic prefix equal in length to five samples. Also the first five samples of the Barker sequence have been appended to the end of the Barker sequence as cyclic postfix. The concatenated sample sequence of cyclic prefix, Barker sequence, and cyclic postfix is placed in the context of 13 random +/−1 binary samples at either side, beginning, end.

Figure 11:
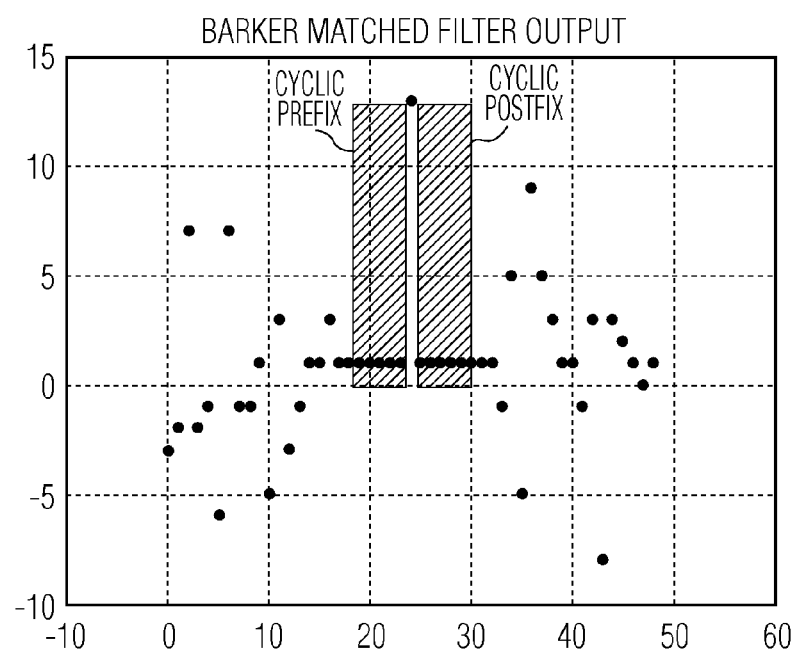
FIG. 11 illustrates a matched filter output for the input signal of FIG. 10, showing ideal correlation behavior around correlation peak over a length equal to that of cyclic prefix and postfix.

FIG. 11 illustrates a matched filter output for the input signal of FIG. 10, showing ideal correlation behavior around the correlation peak over a length equal to that of cyclic prefix and postfix. FIG. 11 shows the output of the Barker matched filter for this input signal. FIG. 11 illustrates that with a prefix and postfix length of five samples to either side of the SOFD Barker sequence, the ideal correlation behavior of the Barker sequence is reproduced. This may facilitate the reliable detection of such a peak.

When the communication may contain multiple entire copies of the SOFD sequence, as with the preamble sequence, this could lead to ambiguity about the time alignment to which of the copies it refers. Consequently, it is intentional that the cyclic prefix and/or cyclic postfix constitute a limited fraction of the SOFD sequence. Multiple entire copies plus fractional copies may be used as well.

One embodiment is demonstrated in FIG. 9. In this embodiment, a cyclic prefix and cyclic postfix may be included. In this embodiment, the receiver may deal with hypothesized positions of the SOFD that are either too early in time or too late. This feature may come at the cost of the transmission time and power consumption involved at transmitter and receiver that is used for both the cyclic prefix and for the cyclic postfix. The length of the cyclic prefix and cyclic postfix may be chosen in dependence on the expected range of the delay parameter in the evaluation of the cross correlation between the received communication packet and the SOFD sequence by means of the SOFD matched filter. The length of the SOFD matched filter may be unchanged with respect to usage of SOFD sequences in communication packets.

Figure 12:
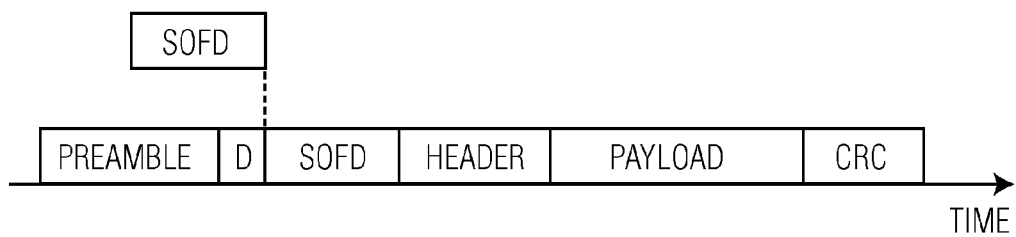
FIG. 12 illustrates extra transmission time that can be reduced by the inclusion of only a cyclic prefix of the SOFD sequence into the communication packet data structure.

FIG. 12 illustrates an embodiment where extra transmission time can be reduced by the inclusion of a cyclic prefix of the SOFD sequence into the communication packet data structure. When early detection of the true SOFD position is more likely than late detection of the SOFD position, the cyclic prefix of the SOFD sequence, alone, may be added to the layout of the communication packet. This embodiment has the advantage that the additional transmission time and the additional power consumption needed at the transmitter and receiver related to the communication of additional bits, or symbols, is limited to that of the cyclic prefix. This may halve the cost of extra bits of an implementation of this embodiment. However, in case the sliding window of the SOFD matched filter is positioned early with respect to the true SOFD position, the full advantages of certain embodiments, in terms of low output of the matched filter for incorrect sliding window positions, and the possibility of accurate setting of threshold levels during this prefix portion for the detection threshold of the matched filter peak may be realized.

Figure 13:
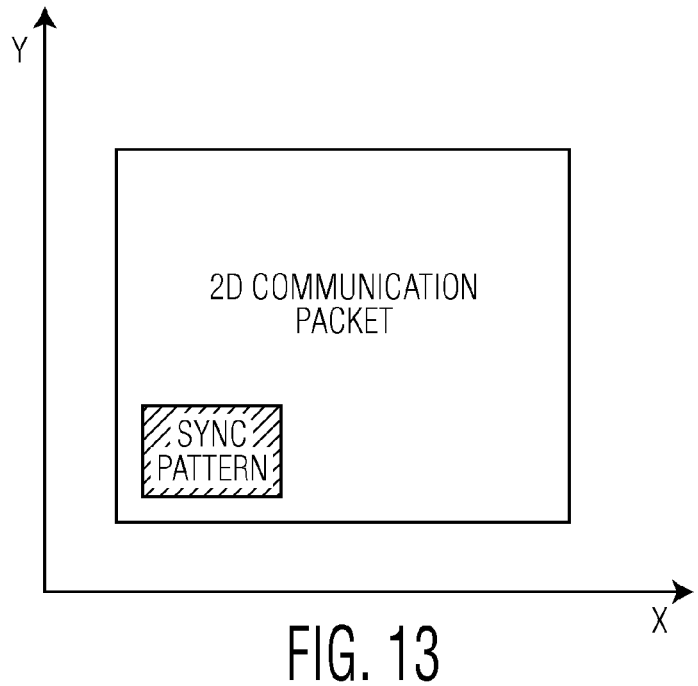
FIG. 13 illustrates 2-dimensional synchronization field, such as a spatial communication signal that contains a 2-dimensional synchronization field in its lower left corner.
Figure 14:
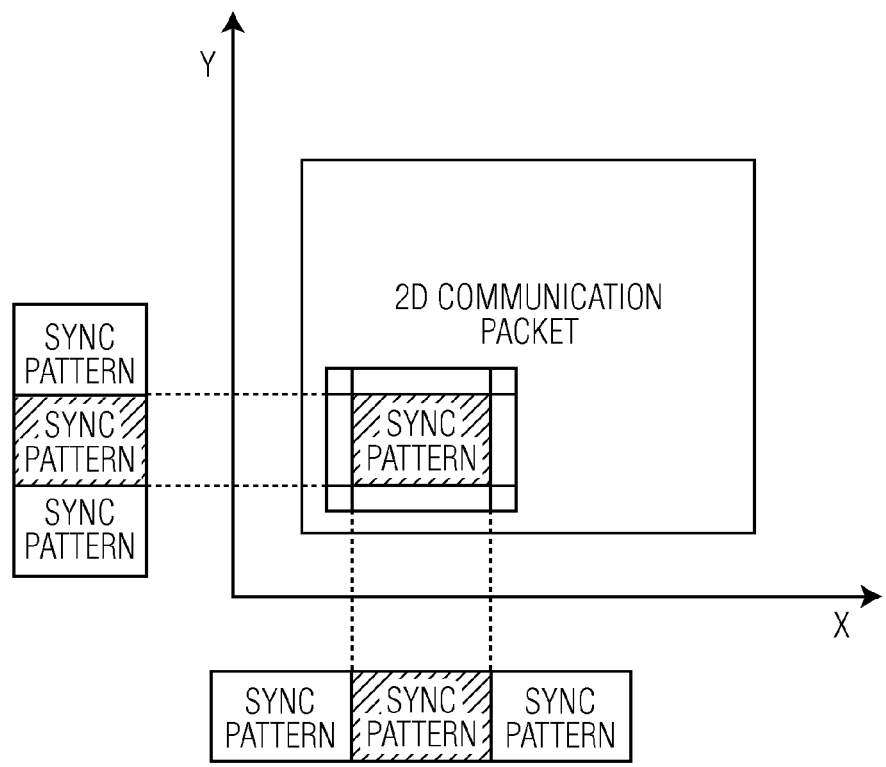
FIG. 14 illustrates a 2-dimensional embodiment in which a 2-dimensional synchronization area is enclosed by cyclic repetition of itself around its edges.

FIG. 13 illustrates a 2-dimensional synchronization field, such as a spatial communication signal that contains a 2-dimensional synchronization field in its lower left corner. A Quick Response (QR) code is an example of a spatial communication signal that contains a 2-dimensional synchronization field. FIG. 14 illustrates a 2-dimensional embodiment in which a 2-dimensional synchronization area is enclosed by cyclic repetition of itself around its edges. The concept that favorable autocorrelation functions of mathematically designed sequences hold in the context of periodic or cyclic repetition of the sequence, may also apply in two or higher dimensions. In the 2-dimensional case, the autocorrelation may be a 2-dimensional function of the X and Y coordinates. The intended small ripple of the ideal autocorrelation function may be realized by the introduction of small cyclic repetitions of the synchronization pattern around the perimeter of the original synchronization pattern. As in FIG. 12, when it is known that misalignment with too small a value of the coordinate X and/or Y of the left, lower corner of the synchronization area are more likely than too large estimates of X and Y, the cyclic repetitions on the right and upper side in FIG. 14 of the synchronization area may be omitted. This may also reduce the communication area and transmitter and receiver costs involved in these areas, and halve associated costs. Simultaneously all benefits of realizing ideal correlation peak detection against too small or too large estimates of the X and Y coordinate of the synchronization area and, hence, the 2D packet, may similarly be realized.

Figure 15:
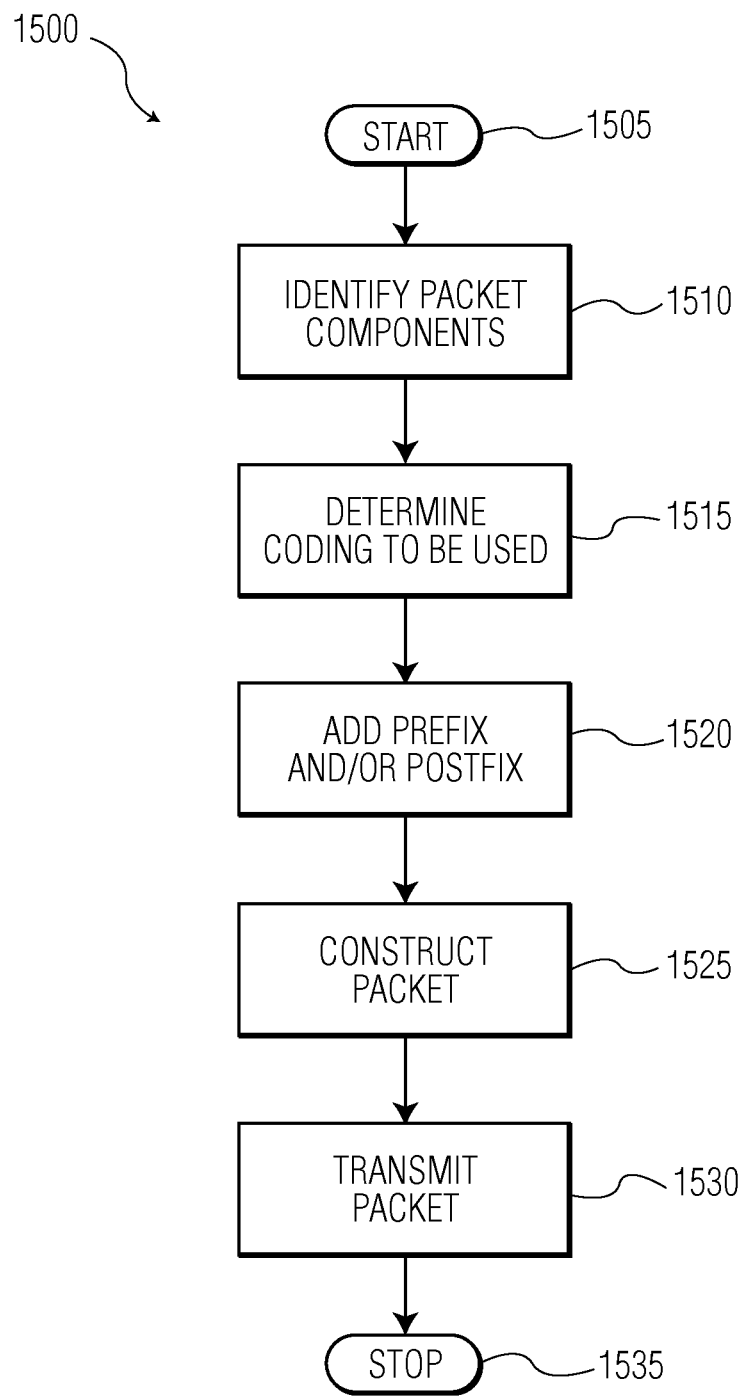
FIG. 15 illustrates a method for transmission a modified SOFD.

FIG. 15 illustrates a method for transmitting a modified SOFD 1500. A transmitter may begin in step 1505 where it may proceed to step 1510 where it may identify packet components. Identifying packet components may include recognizing what types of components are needed for different protocols. In one example, the transmitter may identify communication packet layout 100 including preamble 105, SOFD 110, header sequence 115, payload 120, and CRC 125.

The transmitter may proceed to step 1515 where it may determine which type of coding should be used. For example, Barker, Gold or Kasami coding may be used for the SOFD. Further, the length of the code may be selected here as well.

The transmitter may proceed to step 1520 where it may add the relevant prefix and/or postfix to the SOFD. In some embodiments, the transmitter will add only a prefix, while in other embodiments the transmitter will add only a postfix. Further, in other embodiments the transmitter may add both a prefix and a postfix to the SOFD. In various embodiments, the transmitter will add one or more prefixes and/or postfixes. Similarly, in various embodiments the number of bits used for the prefix and postfix may be varied as needed.

The transmitter may proceed to step 1525 where it may construct the packet. Constructing the packet may include putting together the preamble, SOFD, header, payload and CRC. Constructing the packet may be according to the appropriate communication protocol for the system.

The transmitter may proceed to step 1530 where it may transmit the constructed packet. Transmission of the packet will vary depending on the type of packet and communications medium. For example, transmission may be accomplished using ultrasound, light or radio communication. In some embodiments, communication may be unidirectional from a transmitter to a receiver. In other embodiments, communication may be bidirectional between two transceivers that both contain a transmitter and a receiver part.

The transmitter may proceed to step 1535 where it may stop operation or return to step 1505 and continue again.

Figure 16:
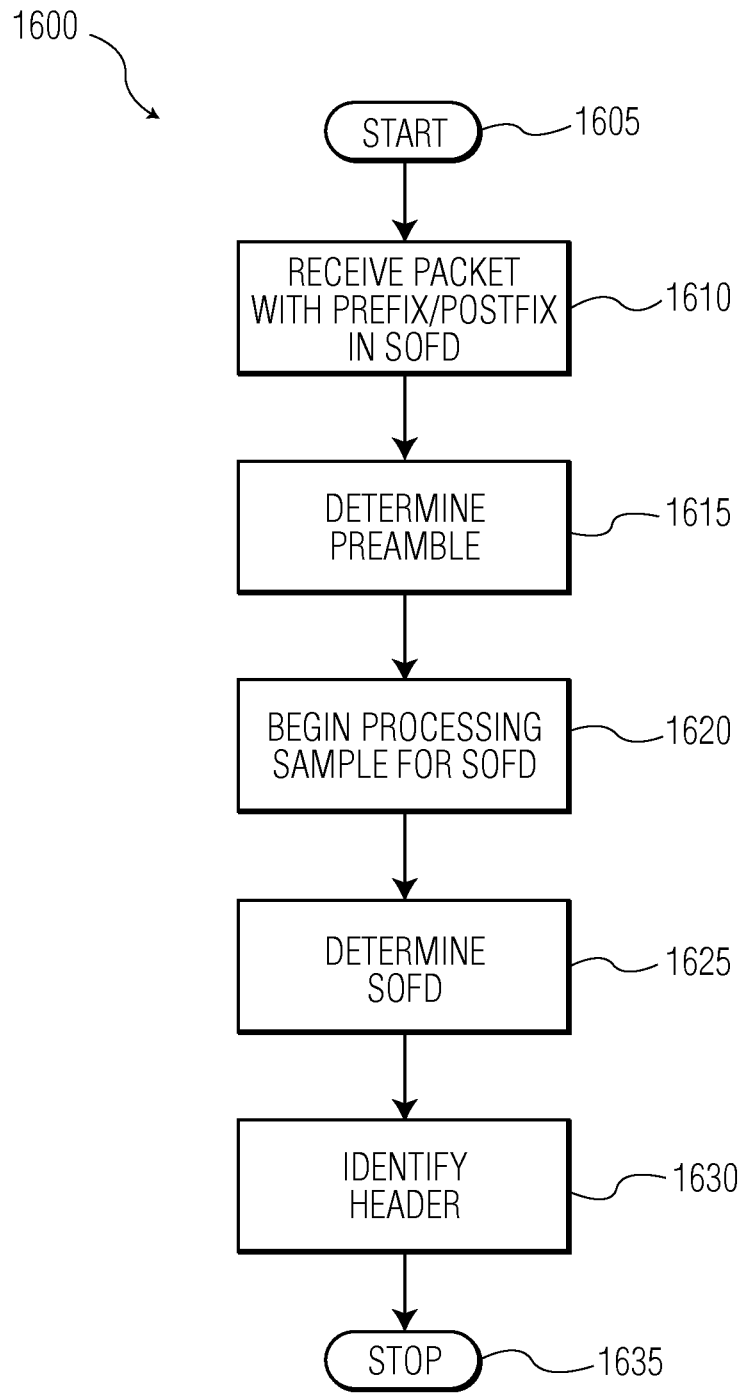
FIG. 16 illustrates a method for receiving a modified SOFD.

FIG. 16 illustrates a method for receiving a modified SOFD 1600. A receiver may begin in step 1605 where it may proceed to step 1610 where it may receive a communications packet containing a cyclic prefix and/or cyclic postfix in the SOFD. Similarly, the communications packet may contain any spreading code with low side lobe levels in its autocorrelation sequence, the spreading code having been coded such as to minimize resulting synchronization and/or ranging ambiguities.

The receiver may continue to step 1615 where it may determine and identify a preamble. Determining the preamble may include identifying preamble 105 from communication packet layout 100. Identifying the preamble may similarly include steps such as packet detection, settling of automatic gain control carrier frequency recovery and bit clock recovery. Carrier phase recovery and bit phase recovery may also be carried out during reception of the preamble.

The receiver may continue to step 1620 where it may begin processing of samples of the SOFD. The communications packet which was received may include any number of cyclic prefixes and/or cyclic postfixes such that the resulting synchronization ambiguities are minimized. Therefore, in step 1620 the receiver may begin detecting some of the cyclic prefixes and/or cyclic postfixes which are included in the communications packet.

The receiver may continue to step 1625 where it may determine the presence of SOFD 110. Determining the presence of the SOFD may occur when the main lobe is detected, or the presence of the SOFD pattern is identified. Determining the SOFD may further include identifying the redundant cyclic postfixes as part of the signal.

The receiver may continue to step 1630 where it may identify the beginning of the header sequence 115. Header sequence 115 may include a sequence index of the radio packet as well as mode information about a communication scheme that is employed.

The receiver may proceed to step 1635 where it may stop operation or return to step 1605 and continue again.

Figure 17:
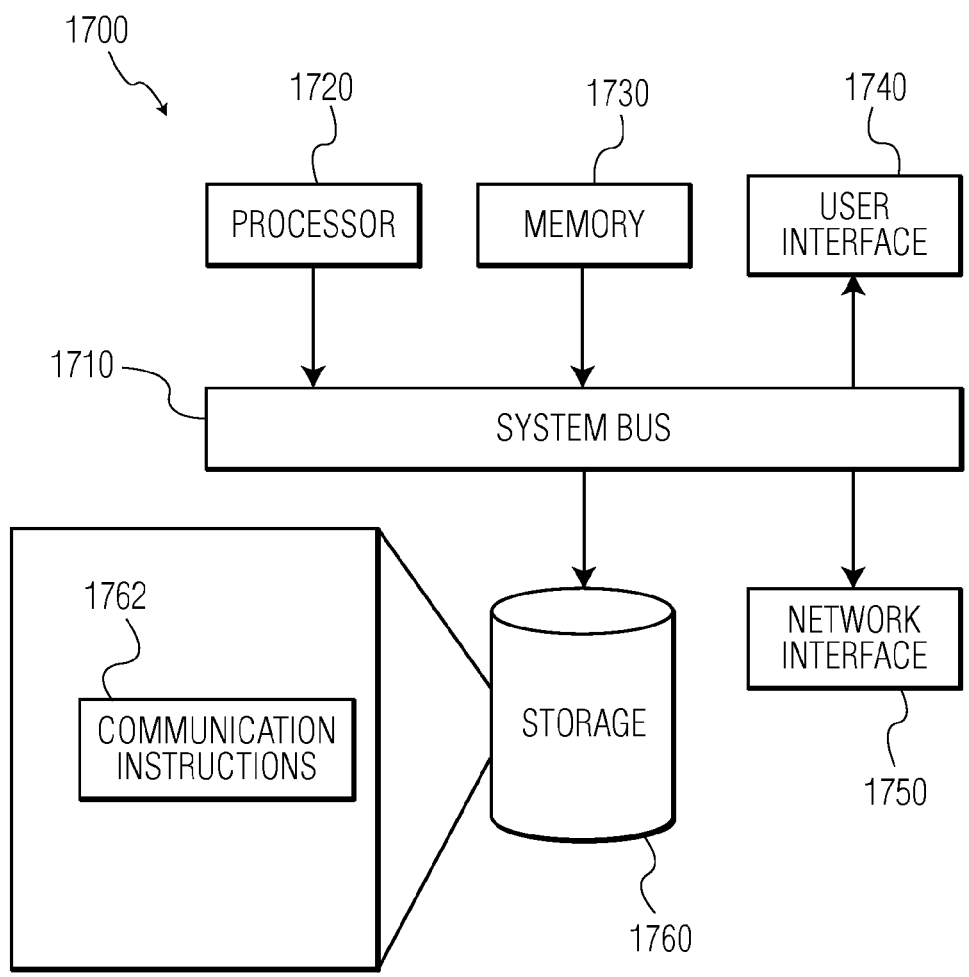
FIG. 17 illustrates an example of a hardware system.

FIG. 17 illustrates an example of a hardware system 1700 for implementing the coding and communication schemes described herein. The hardware system 1700 may correspond to virtually any device that may participate in a coding scheme such as, for example, a mobile communications device, server, smart card, near field communication (NFC) device, microcontroller, transmitter, receiver, or other device.

As shown, the device 1700 includes a processor 1720, memory 1730, user interface 1740, network interface 1750, and storage 1760 interconnected via one or more system buses 1710. It will be understood that FIG. 17 constitutes, in some respects, an abstraction and that the actual organization of the components of the device 1700 may be more complex than illustrated.

The processor 1720 may be any hardware device capable of executing instructions stored in the memory 1730 or the storage 1760. As such, the processor may include a microprocessor, field programmable gate array (FPGA), application-specific integrated circuit (ASIC), or other similar devices.

The memory 1730 may include various memories such as, for example L17, L2, or L3 cache or system memory. As such, the memory 1730 may include static random access memory (SRAM), dynamic RAM (DRAM), flash memory, read only memory (ROM), or other similar memory devices.

The user interface 1740 may include one or more devices for enabling communication with a user such as an administrator. For example, the user interface 1740 may include access to a display, a mouse, and a keyboard for receiving user commands. In some embodiments, the user interface 1740 may include a command line interface or graphical user interface that may be presented to a remote device via the network interface 1750.

The network interface 1750 may include one or more devices for enabling communication with other hardware devices. For example, the network interface 1750 may include a network interface card (NIC) configured to communicate according to the Ethernet or Bluetooth protocol, or a wireless protocol such as CDMA, TDMA or FDMA. Additionally, the network interface 1750 may implement a TCP/IP stack for communication according to the TCP/IP protocols, for example. Various alternative or additional hardware or configurations for the network interface 1750 will be apparent.

The storage 1760 may include one or more machine-readable storage media such as read-only memory (ROM), random-access memory (RAM), magnetic disk storage media, optical storage media, flash-memory devices, or similar storage media. In various embodiments, the storage 1760 may store instructions for execution by the processor 1720 or data upon which the processor 1720 may operate.

It will be apparent that various information described as stored in the storage 1760, may be additionally or alternatively stored in the memory 1730. In this respect, the memory 1730 may also be considered to constitute a "storage device" and the storage 1760 may be considered a "memory." Various other arrangements will be apparent. Further, the memory 1730 and storage 1760 may both be considered to be "non-transitory machine-readable media." As used herein, the term "non-transitory" will be understood to exclude transitory signals but to include all forms of storage, including both volatile and non-volatile memories.

In some embodiments, storage 1760 may contain communication instructions 1762, for example. Communication instructions may include instructions related to transmitting and/or receiving various codes. The instructions may be related to the relevant protocol used to transmit or receive.

While the hardware device 1700 is shown as including one of each described component, the various components may be duplicated in various embodiments. For example, the processor 1720 may include multiple microprocessors that are configured to independently execute the methods described herein or are configured to perform steps or subroutines of the methods described herein such that the multiple processors cooperate to achieve the functionality described herein. Various additional arrangements will be apparent.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A transmitter for communicating, the transmitter comprising:
   a memory;
   a processor in communication with the memory, the processor configured to: determine a spreading code with low sidelobe levels in its autocorrelation sequence to be used; create a Start of Frame Delimiter (SOFD) for a packet including the spreading code and a cyclic prefix, wherein the cyclic prefix is a limited fraction of a SOFD sequence and less than half of a length of the spreading code, and transmit the packet with the SOFD.

2. The transmitter of claim 1, wherein the processor is further configured to: create the SOFD including a cyclic postfix that is the limited fraction of the SOFD sequence, wherein the SOFD with the cyclic prefix and the cyclic postfix is autocorrelation capable.

3. The transmitter of claim 2, wherein the cyclic postfix is less than half of a length of the spreading code.

4. The transmitter of claim 1, wherein the processor is further configured to: code the SOFD using a Gold Sequence.

5. The transmitter of claim 1, wherein the processor is further configured to: code the SOFD using a Kasami Sequence.

6. The transmitter of claim 1, wherein the processor is further configured to: code the SOFD using a Barker Sequence.

7. A device for performing a method of communication transmission, the device comprising:
   a memory;
   a processor configured to: determine a spreading code with low sidelobe levels in its autocorrelation sequence to be used; create a Start of Frame Delimiter (SOFD) for a packet including the spreading code and a cyclic prefix, wherein the cyclic prefix is a limited fraction of a SOFD sequence and less than half of a length of the spreading code; and transmit the packet with the SOFD.

8. The device of claim 7, wherein the processor is further configured to: create the SOFD including a cyclic postfix that is the limited fraction of the SOFD sequence, wherein the SOFD with the cyclic prefix and the cyclic postfix is autocorrelation capable.

9. The device of claim 8, wherein the cyclic postfix is less than half of a length of the spreading code.

10. The device of claim 7, wherein the processor is further configured to: code the SOFD using a Gold Sequence.

11. The device of claim 7, wherein the processor is further configured to: code the SOFD to include multiple cyclic sequences.

12. The device of claim 7, wherein the processor is further configured to: code the SOFD using a Barker Sequence.

13. A tangible and non-transitory machine-readable storage medium encoded with instructions thereon for execution of a method of communication transmission, wherein said tangible and non-transitory machine-readable storage medium comprising:

instructions for determining a spreading code with low sidelobe levels in its autocorrelation sequence to be used;

instructions for creating a Start of Frame Delimiter (SOFD) for a packet including the spreading code and a cyclic prefix, wherein the cyclic prefix is a limited fraction of a SOFD sequence and less than half of a length of the spreading code; and instructions for transmitting the packet with the SOFD.

14. The storage medium of claim 13, further comprising:

instructions for creating the SOFD including a cyclic postfix that is a limited fraction of the SOFD sequence, wherein the SOFD with the cyclic prefix and the cyclic postfix is autocorrelation capable.

15. The storage medium of claim 14, wherein the cyclic postfix is less than half of a length of the spreading code.

16. The storage medium of claim 14, wherein coding the SOFD further comprises coding the SOFD using a Gold Sequence.

17. The storage medium of claim 14, wherein coding the SOFD further comprises coding the SOFD using a Barker Sequence.

18. The storage medium of claim 14, wherein coding the SOFD further comprises coding the SOFD using a Kasami Sequence.

* * * * *